(12) United States Patent
Liu et al.

(10) Patent No.: US 10,243,876 B2
(45) Date of Patent: Mar. 26, 2019

(54) CHIP-BASED DATA TRANSMISSION METHOD, DEVICE AND SYSTEM, AND COMPUTER STORAGE MEDIUM

(71) Applicant: Sanechips Technology Co., Ltd., Shenzhen (CN)

(72) Inventors: Lan Liu, Shenzhen (CN); Chen Yu, Shenzhen (CN)

(73) Assignee: Sanechips Technology Co., Ltd., Shenzhen, Guangdong (CN)

( * ) Notice: Subject to any disclaimer, the term of this patent is extended or adjusted under 35 U.S.C. 154(b) by 255 days.

(21) Appl. No.: 14/907,695

(22) PCT Filed: Sep. 26, 2014

(86) PCT No.: PCT/CN2014/087553
§ 371 (c)(1),
(2) Date: Jan. 26, 2016

(87) PCT Pub. No.: WO2015/165206
PCT Pub. Date: Nov. 5, 2015

(65) Prior Publication Data
US 2016/0164802 A1    Jun. 9, 2016

(30) Foreign Application Priority Data
Apr. 30, 2014   (CN) .......................... 2014 1 0183010

(51) Int. Cl.
*H04L 29/08* (2006.01)
*H04L 12/927* (2013.01)
*H04L 1/22* (2006.01)

(52) U.S. Cl.
CPC .............. *H04L 47/805* (2013.01); *H04L 1/22* (2013.01); *H04L 69/324* (2013.01)

(58) Field of Classification Search
None
See application file for complete search history.

(56) References Cited

U.S. PATENT DOCUMENTS 8,443,256 B2    5/2013  Shafai
9,178,692 B1 *  11/2015 Channabasappa .... H04L 69/324
(Continued)

FOREIGN PATENT DOCUMENTS

CN    1764182 A     4/2006
CN    102257849 A   11/2011
(Continued)

OTHER PUBLICATIONS

International Search Report in international application No. PCT/CN2014/087553, dated Jan. 28, 2015.
English Translation of the Written Opinion of the International Search Authority in international application No. PCT/CN2014/087553, dated Jan. 28, 2015.
(Continued)

*Primary Examiner* — Noel R Beharry
*Assistant Examiner* — Pamit Kaur
(74) *Attorney, Agent, or Firm* — Oppedahl Patent Law Firm LLC

(57) ABSTRACT

Disclosed is a chip-based data transmission method for a data sending side. The method includes that protocol layer processing is performed on input data, and the data after the protocol layer processing is mapped to each physical channel for transmission; meta-frame layer processing is performed on the data transmitted by each physical channel, and the data after the meta-frame layer processing is sent. Another chip-based data transmission method for a data receiving side is provided which includes that meta-frame layer processing is performed on data received by each physical channel, the data after the meta-frame layer processing is mapped to a protocol layer for transmission, and the protocol layer processing is performed on the data transmitted by the protocol layer, and the data after the protocol layer processing is sent. A chip-based data transmission device and system, and a computer storage medium are also provided.

14 Claims, 9 Drawing Sheets

Step 101: Protocol layer processing is performed on input data, and the data after the protocol layer processing is mapped to each physical channel for transmission Step 102: Meta-frame layer processing is performed on data transmitted by each physical channel, and the data after the meta-frame layer processing is sent

(56) References Cited

U.S. PATENT DOCUMENTS

| | | |
|---|---|---|
| 2005/0180521 A1 | 8/2005 | Hsu |
| 2012/0192044 A1 | 7/2012 | Shafai |
| 2013/0101058 A1 | 4/2013 | Hummel |
| 2013/0104012 A1 | 4/2013 | Barner |
| 2014/0093022 A1* | 4/2014 | Shi .................. H04L 41/0816 |
| | | 375/358 |

FOREIGN PATENT DOCUMENTS

| | | |
|---|---|---|
| CN | 102439995 A | 5/2012 |
| CN | 102591836 A | 7/2012 |
| CN | 102821458 A | 12/2012 |
| WO | 2011147381 A2 | 12/2011 |

OTHER PUBLICATIONS

Li, Yufeng et al., "Research of Interlaken Protocol and Implementation Technology", Electronic Design Engineering, vol. 19, No. 2, Jan. 31, 2011 (Jan. 31, 2011), ISSN: p. 5, left-hand column, paragraph 2 to p. 7, right-hand column, paragraph 5.

Supplementary European Search Report in European application No. 14890757.9, dated Aug. 5, 2016.

"Interlaken Protocol Definition a Joint Specification of Cortina Systems and Cisco Systems", Oct. 7, 2008,No. Revision 1.27 Oct. 2008 (Oct. 7, 2008), pp. 1-52, XP002668446, Retrieved from the Internet: URL: http://www.interlakenalliance.com/Inter laken_Protocol_Definition_v1.2.pdf [retrieved on Jan. 30, 2012].

Research of Interlaken protocol and implementation technology, dated Jan. 2011.

\* cited by examiner

Diagnosis control word

Fig. 12
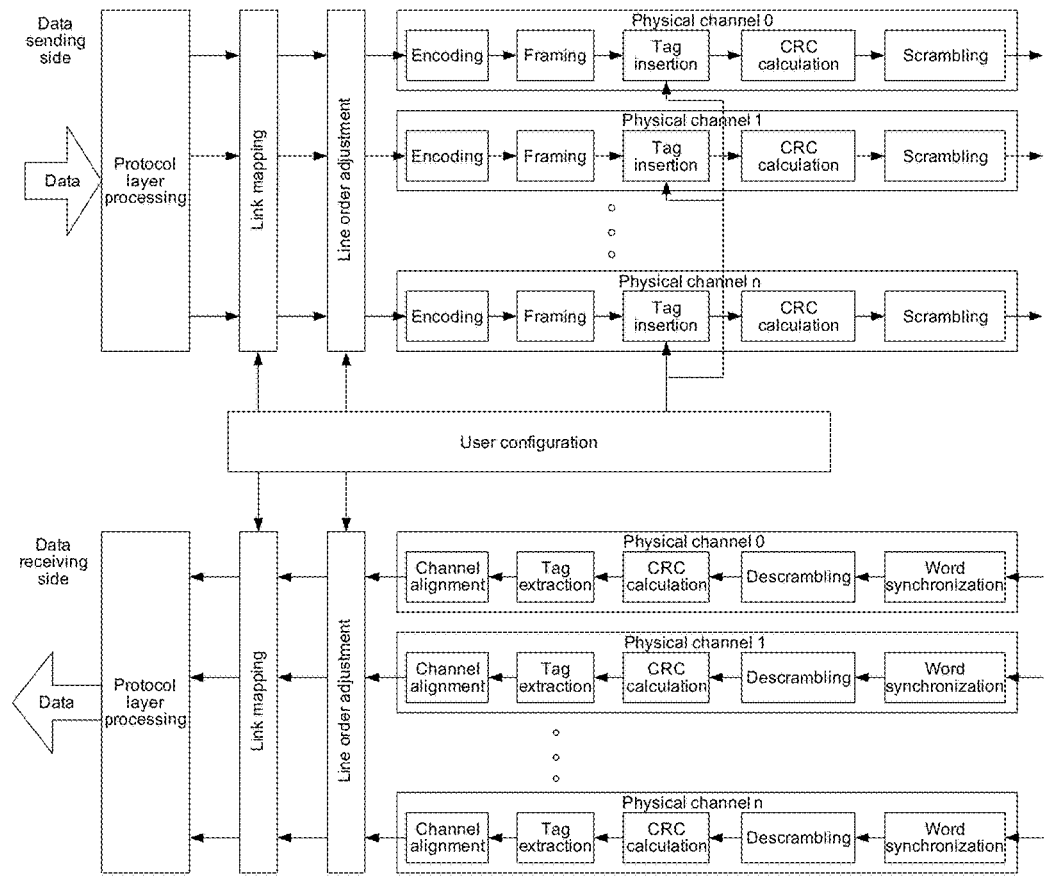
Fig. 13
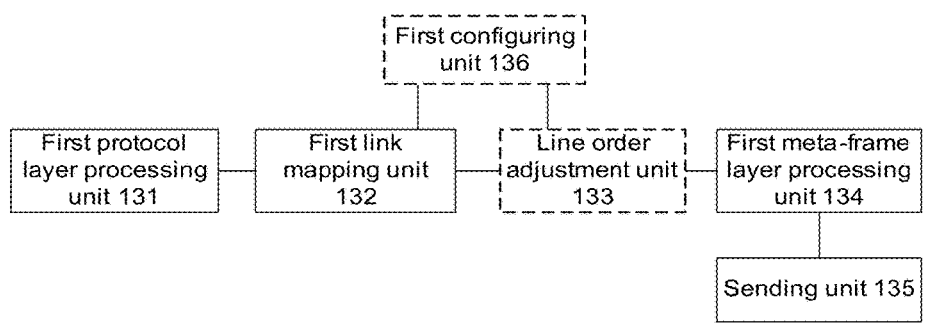
5Fig. 14
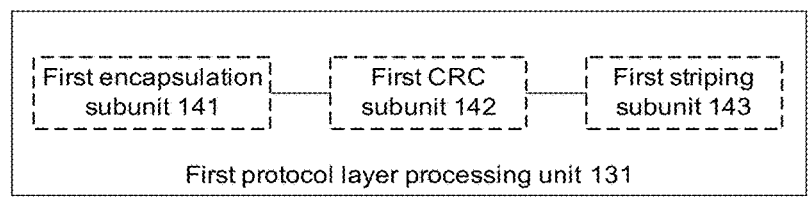

CHIP-BASED DATA TRANSMISSION METHOD, DEVICE AND SYSTEM, AND COMPUTER STORAGE MEDIUM

TECHNICAL FIELD

The present disclosure relates to a chip technology in the field of network communications, and in particular to a chip-based data transmission method, device and system, and a computer storage medium.

BACKGROUND

The Interlaken and Interlaken LA protocol is an interface standard of implementing a high-bandwidth and high-reliability transmission between chips. The protocol can establish a physical connection and a logical connection between chips based on the serial link technology. Because the protocol is applied to a large bandwidth range, and has expansibility and channel flexibility, at present, an interface applying the protocol has taken the place of the SPI-4.2 interface essentially, which makes the interface applying the protocol becomes the mainstream interface of a new generation of network processing chips and become the mainstream technology of high-speed connection in future.

With the fast increase of requirements of chips on data bandwidth and the fast increase of the number of meta-frame layer physical channels, new requirements for the reliability, compatibility and flexibility of a chip interface are made currently. By taking a chip which has an interface line speed exceeding 200G for example, the chip often needs about 24 physical channels of 10.3125G to implement the normal data transmission in practical application; but for some chips with large capacity, a few hundred physical channels will be needed in practical application; however, in the related technologies, the requirements of different applications are often met by integrating interfaces which can be compatible with multiple line speed bandwidths on one chip, which increases the complexity of the chip interface and brings a major challenge to the chip design while increasing the design cost and manufacture cost of the chip.

At present, the rate of the SerDes interface between chips becomes higher and higher, a big challenge is brought to the design of a single board and a backplane while a higher requirement for the reliability of the chip interface is made; specifically, in practical application, a chip interface often cannot work normally because of unstable working status of a SerDes interface of a certain link of the chip, or a wrong wiring connection or an unmatched connection order between an interface card and a line card in the design of a single board, which affects the application of the whole chip; besides, because of the rapid development of bandwidth requirement, a core router and a switch are frequently upgraded and updated, which makes a new requirement for the compatibility of the chip interface.

SUMMARY

In view of this, the embodiments of the present disclosure provide a chip-based data transmission method, device and system, and a computer storage medium, which can improve the flexibility and compatibility of a chip interface without increasing extra cost, guarantee the bandwidth utilization of the chip interface, and reduce the risk and cost of chip design.

To this end, the technical solutions of the present disclosure are implemented as follows.

A chip-based data transmission method applied on a data sending side is provided, which includes that:

protocol layer processing is performed on data which is input, and the data after the protocol layer processing is mapped to each physical channel for transmission; and meta-frame layer processing is performed on the data transmitted by the each physical channel, and the data after the meta-frame layer processing is sent.

In an embodiment of the present disclosure, performing the meta-frame layer processing on the data transmitted by the each physical channel may include that:

a line order adjustment is performed on the data transmitted by the each physical channel; and the meta-frame layer processing is performed on the data transmitted by the each physical channel after the line order adjustment.

In an embodiment of the present disclosure, performing the protocol layer processing on the data which is input may include that:

the data is encapsulated;

a Cyclic Redundancy Check Code (CRC) calculation is performed on the data after the encapsulation; and striping processing is performed on the data after the CRC calculation.

In an embodiment of the present disclosure, the method may further include that:

a mapping relationship is configured according to a type of a chip interface and/or a bandwidth requirement;

mapping the data after the protocol layer processing to the each physical channel for transmission may include that: the data after the protocol layer processing is mapped to the each physical channel for transmission according to the mapping relationship.

In an embodiment of the present disclosure, performing the line order adjustment on the data transmitted by the each physical channel may include that:

when a link corresponding to a physical channel is incapable of transmitting data normally, a line order adjustment relationship is configured according to a bandwidth requirement and/or a stability state of the link;

the data transmitted by the physical channel is transferred to a link of a redundant physical channel for transmission according to the line order adjustment relationship.

In an embodiment of the present disclosure, performing the meta-frame layer processing on the data transmitted by the each physical channel may include that:

encoding and framing are performed on the data transmitted by the each physical channel;

tags are respectively inserted in the data transmitted by the each physical channel after the framing; and the CRC calculation and scrambling are performed on the data transmitted by the each physical channel after the tags are inserted;

wherein the tags represent an order of links for transmitting the data on the each physical channel.

In an embodiment of the present disclosure, respectively inserting the tags in the data transmitted by the each physical channel after the framing may include that: the tags are respectively inserted in reserved fields of a meta-frame layer diagnosis control word of the each physical channel after the framing.

A chip-based data transmission method applied on a data receiving side is provided, which includes that:

meta-frame layer processing is performed on data received by each physical channel;

the data after the meta-frame layer processing is mapped to a protocol layer for transmission; and protocol layer processing is performed on the data transmitted by the protocol layer, and the data after the protocol layer processing is output.

In an embodiment of the present disclosure, mapping the data after the meta-frame layer processing to the protocol layer for transmission may include that:

line order recovery is performed on the data transmitted by the each physical channel after the meta-frame layer processing; and the data after the line order recovery is mapped to the protocol layer for transmission.

In an embodiment of the present disclosure, performing the meta-frame layer processing on the data received by the each physical channel may include that:

word synchronization, descrambling and a CRC calculation are performed on the data received by the each physical channel;

tags are extracted from the data transmitted by the each physical channel after the CRC calculation; and channel alignment is performed according to the extracted tags and the data transmitted by the each physical channel.

In an embodiment of the present disclosure, the method may further include that:

tags are respectively configured for local channels on the data receiving side;

the line order recovery is performed on the data received by the each physical channel may include that: the extracted tags are respectively matched to the tags of the local channels on the data receiving side;

when they do not match, the line order recovery is performed on the data transmitted by the each physical channel according to the tags of the local channels of the data receiving side, and the data transmitted by the each physical channel is respectively transferred to corresponding local channels for transmission;

when they match, the data transmitted by the each physical channel is respectively transferred to the corresponding local channels for transmission.

In an embodiment of the present disclosure, the method may further include that:

a mapping relationship is configured according to a type of a chip interface and/or a bandwidth requirement;

mapping the data after the meta-frame layer processing to the protocol layer for transmission may include that: the data after the meta-frame layer processing is mapped to the protocol layer for transmission according to the mapping relationship.

In an embodiment of the present disclosure, performing the protocol layer processing on the data transmitted by the protocol layer may include that:

striping processing is performed on the data transmitted by the local channels;

a CRC calculation is performed on the data after the striping processing; and de-encapsulation is performed on the data after the CRC calculation.

A chip-based data transmission method is provided, which includes that:

data is sent according to the chip-based data transmission method applied on a data sending side; and data is received according to the chip-based data transmission method applied on a data receiving side.

A chip-based data transmission device which is arranged on a data sending side is provided, which includes a first protocol layer processing unit, a first link mapping unit, a first meta-frame layer processing unit and a sending unit; wherein, the first protocol layer processing unit is configured to perform protocol layer processing on data which is input;

the first link mapping unit is configured to map the data after the protocol layer processing to each physical channel for transmission;

the first meta-frame layer processing unit is configured to perform meta-frame layer processing on the data transmitted by the each physical channel; and the sending unit is configured to send the data after the meta-frame layer processing.

In an embodiment of the present disclosure, the device may further include a line order adjustment unit; wherein, the line order adjustment unit is configured to perform line order adjustment on the data transmitted by the each physical channel;

the first meta-frame layer processing unit is specifically configured to perform the meta-frame layer processing on the data transmitted by the each physical channel after the line order adjustment.

In an embodiment of the present disclosure, the first protocol layer processing unit may include a first encapsulation subunit, a first CRC subunit and a first striping subunit; wherein, the first encapsulation subunit is configured to perform encapsulation on the data;

the first CRC subunit is configured to perform the CRC calculation on the data after the encapsulation; and the first striping subunit is configured to perform the striping processing on the data after the CRC calculation.

In an embodiment of the present disclosure, the device may further include a first configuring unit; wherein, the first configuring unit is configured to configure a mapping relationship according to a type of a chip interface and/or a bandwidth requirement;

the first link mapping unit is specifically configured to map the data after the protocol layer processing to the each physical channel for transmission according to the mapping relationship.

In an embodiment of the present disclosure, the first configuring unit may be further configured to, when a link corresponding to a physical channel is incapable of transmitting data normally, configure a line order adjustment relationship according to a bandwidth requirement and/or the stability state of the link;

the line order adjustment unit is specifically configured to transfer the data transmitted by the physical channel to a link of the redundant physical channel for transmission according to the line order adjustment relationship.

In an embodiment of the present disclosure, the first meta-frame layer processing unit may include an encoding subunit, a framing subunit, a tag inserting subunit, a second CRC subunit and a scrambling subunit; wherein, the encoding subunit is configured to encode the data transmitted by the each physical channel;

the framing subunit is configured to perform framing on the data transmitted by the each physical channel after the encoding;

the tag inserting subunit is configured to respectively insert tags in the data transmitted by the each physical channel after the framing;

the second CRC subunit is configured to perform the CRC calculation on the data transmitted by the each physical channel after the tags are inserted; and the scrambling subunit is configured to perform scrambling on the data transmitted by the each physical channel after the CRC calculation.

In an embodiment of the present disclosure, the tag inserting subunit may be specifically configured to respectively insert the tags in reserved fields of a meta-frame layer diagnosis control word of the each physical channel after the framing.

A chip-based data transmission device which is arranged on the data receiving side is provided, which includes a second meta-frame layer processing unit, a second link mapping unit, a second protocol layer processing unit and an outputting unit; wherein, the second meta-frame layer processing unit is configured to perform meta-frame layer processing on data received by each physical channel;

the second link mapping unit is configured to map the data after the meta-frame layer processing to a protocol layer for transmission;

the second protocol layer processing unit is configured to perform protocol layer processing on the data transmitted by the protocol layer; and the outputting unit is configured to output the data after the protocol layer processing.

In an embodiment of the present disclosure, the device may further include a line order recovery unit; wherein, the line order recovery unit is configured to perform line order recovery on the data transmitted by the each physical channel after the meta-frame layer processing;

the second link mapping unit is specifically configured to map the data after the line order recovery to the protocol layer for transmission.

In an embodiment of the present disclosure, the second meta-frame layer processing unit may include a synchronization subunit, a descrambling subunit, a third CRC subunit, a tag extracting subunit and a channel alignment subunit; wherein, the synchronization subunit is configured to perform word synchronization on the data received by the each physical channel;

the descrambling subunit is configured to perform descrambling on the data transmitted by the each physical channel after the word synchronization;

the third CRC subunit is configured to perform a CRC calculation on the data transmitted by the each physical channel after the descrambling;

the tag extracting subunit is configured to extract tags from the data transmitted by the each physical channel after the CRC calculation; and the channel alignment subunit is configured to perform channel alignment according to the extracted tags and the data transmitted by the each physical channel.

In an embodiment of the present disclosure, the device may further include a second configuring unit; wherein, the second configuring unit is configured to respectively configure tags for local channels on the data receiving side;

the line order recovery unit is specifically configured to respectively match the extracted tags to the tags of the local channels on the data receiving side; when they do not match, perform the line order recovery on the data transmitted by the each physical channel according to the tags of the local channels on the data receiving side, and respectively transfer the data transmitted by the each physical channel to corresponding local channels for transmission; when they match, respectively transfer the data transmitted by the each physical channel to the corresponding local channels for transmission.

In an embodiment of the present disclosure, the second configuring unit may be further configured to configure a mapping relationship according to a type of a chip interface and/or a bandwidth requirement;

the second link mapping unit may be specifically configured to map the data after the meta-frame layer processing to the protocol layer for transmission according to the mapping relationship.

In an embodiment of the present disclosure, the second protocol layer processing unit may include a second striping subunit, a fourth CRC subunit and a de-encapsulation subunit; wherein, the second striping subunit is configured to perform the striping processing on the data transmitted by the local channels;

the fourth CRC subunit is configured to perform the CRC calculation on the data after the striping processing;

de-encapsulation subunit is configured to perform de-encapsulation on the data after the CRC calculation.

A chip-based data transmission system is provided, which includes a data-sending-side device and a data-receiving-side device; wherein, the data-sending-side device is configured to perform the protocol layer processing on data which is input, map the data after the protocol layer processing to each physical channel for transmission, perform the meta-frame layer processing on the data transmitted by the each physical channel, and send the data after the meta-frame layer processing; and the data-receiving-side device is configured to perform meta-frame layer processing on the data received by each physical channel, map the data after the meta-frame layer processing to a protocol layer for transmission, perform protocol layer processing on the data transmitted by the protocol layer, and output the data after the protocol layer processing.

A computer storage medium which stores computer-executable instructions for executing the above methods.

According to the chip-based data transmission method, device and system, and the computer storage medium provided by the present disclosure, protocol layer processing is performed on input data on a data sending side, and the data after the protocol layer processing is mapped to each physical channel for transmission; on the data sending side, meta-frame layer processing is performed on the data transmitted by the each physical channel, and the data after the meta-frame layer processing is sent to a data receiving side; on the data receiving side, meta-frame layer processing is performed on the data received by each physical channel, and the data after the meta-frame layer processing is mapped to a protocol layer for transmission; on the data receiving side, protocol layer processing is performed on the data transmitted by the protocol layer, and the data after the protocol layer processing is output. In this way, multiple protocol interfaces can be supported by a physical channel of a metal-frame layer based on a mapping relationship between a data sending side and a data receiving side, and the area, resources and power of a chip can be saved; besides, the influence of link anomaly to the performance of the chip can be reduced, and the robustness of the chip is improved.

In addition, on the data sending side in the present disclosure, line order adjustment can be performed, and on the data receiving side, line order recovery can be performed; so, even though reverse order or random order of the physical channels on the data sending side and the data receiving side occurs during Printed Circuit Board (PCB) wiring, there is no need to redesign a single board, thereby improving the compatibility of a chip interface.

BRIEF DESCRIPTION OF THE DRAWINGS

FIG. 12 is a data flow diagram of the chip-based data transmission method according to embodiment 3 of the present disclosure;

FIG. 13 is a structural diagram of a chip-based data transmission device according to embodiment 1 of the present disclosure;

FIG. 14 is a structural diagram of a first protocol layer processing unit of the present disclosure;

DETAILED DESCRIPTION

In the present disclosure, on the data sending side, protocol layer processing is performed on input data and the data after the protocol layer processing is mapped to each physical channel for transmission; on the data sending side, meta-frame layer processing is performed on the data transmitted by each physical channel, and the data after the meta-frame layer processing is sent to the data receiving side; on the data receiving side, meta-frame layer processing is performed on the data received by each physical channel and the data after the meta-frame layer processing is mapped to the protocol layer for transmission; on the data receiving side, protocol layer processing is performed on the data transmitted by the protocol layer and the data after the protocol layer processing is output.

The present disclosure is further elaborated below in combination with the accompanying drawings and embodiments.

Figure 1:
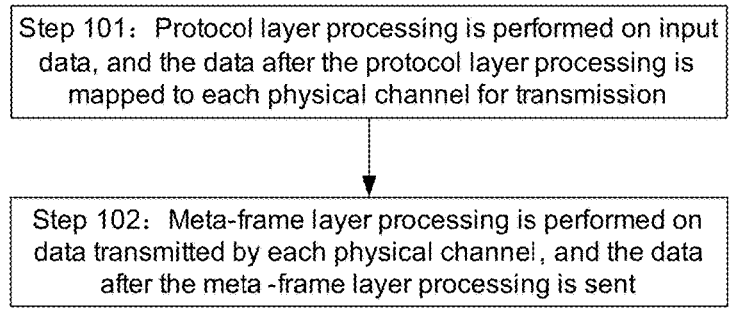
FIG. 1 is an implementation flowchart of a chip-based data transmission method according to embodiment 1 of the present disclosure.
Figure 2:
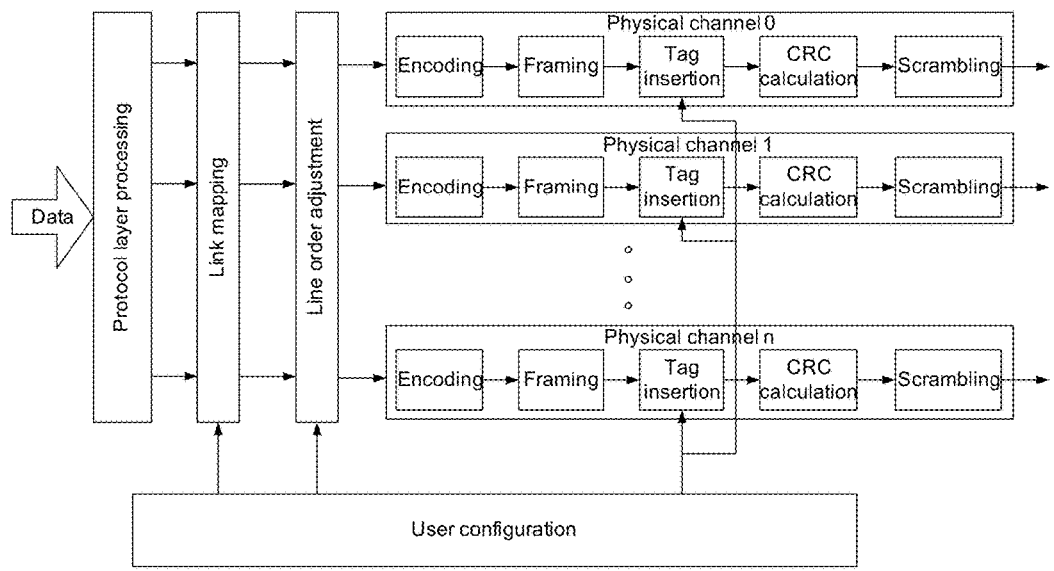
FIG. 2 is a data flow diagram of the chip-based data transmission method according to the embodiment 1 of the present disclosure.

FIG. 1 is an implementation flowchart of a chip-based data transmission method according to embodiment 1 of the present disclosure, and FIG. 2 is a data flow diagram of the chip-based data transmission method according to embodiment 1 of the present disclosure; as shown in FIG. 1 and FIG. 2, the method includes the following steps.

Step 101 is that protocol layer processing is performed on input data, and the data after the protocol layer processing is mapped to each physical channel for transmission;

in this step, on the data sending side, the input data is encapsulated, a CRC calculation is performed on the data after the encapsulation, and striping processing is performed on the data after the CRC calculation, so as to implement protocol layer processing on the input data; optionally, the CRC calculation can be a CRC24 calculation, wherein the CRC24 calculation represents a 24-bit CRC calculation.

After the protocol layer processing performed on the input data is completed, a user can configure a mapping relationship according to the type of a chip interface and/or a bandwidth requirement of the data sending side; on the data sending side, the data after the protocol layer processing is mapped to each physical channel for transmission according to the mapping relationship, wherein multiplexing of each physical channel can be realized by mapping the data after the protocol layer processing to different physical channels for transmission; thus, the resource, area and power of a chip can be reduced by multiplexing each physical channel.

Figure 3:
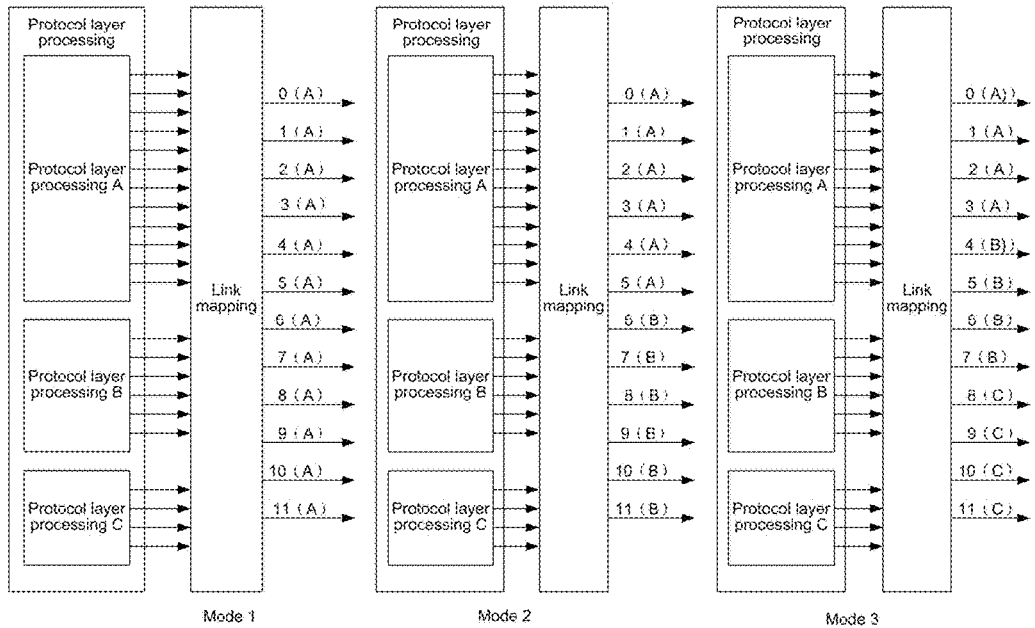
FIG. 3 is a diagram of a link mapping relationship on a data sending side of the present disclosure.

FIG. 3 is a diagram of a link mapping relationship on the data sending side of the present disclosure; as shown in FIG. 3, in three different mapping modes, the protocol layer processing on the data sending side includes coordinate and independent three protocol layer processing procedures A, B and C; wherein, the input data enters the three protocol layers A, B and C, respectively; in the three protocol layer processing procedures A, B and C, the protocol layer processing performed on the data is identical; it should be noted that A, B and C here are only for differentiating each other, and do not form a limit to the present disclosure; the data after the three protocol layer processing A, B and C is reasonably mapped to 12 physical channels for sending according to the configured mapping relationship; it should be noted that, 12 here is only taken for example, and does not form a limit to the present disclosure.

Optionally, in mode 1, according to the mapping relationship configured by the user, all the 12 physical channels are for transmitting the data after the protocol layer processing A;

in mode 2, according to the mapping relationship configured by the user, the physical channels 0-5 are for transmitting the data after the protocol layer processing A, and the physical channels 6-11 are for transmitting the data after the protocol layer processing B;

in mode 3, according to the mapping relationship configured by the user, the physical channels 0-3 are for transmitting the data after the protocol layer processing A, the physical channels 4-7 are for transmitting the data after the protocol layer processing B, and the physical channels 8-11 are for transmitting the data after the protocol layer processing C; it can be seen that only 12 physical channels can meet the requirements of different types of interfaces for transmitting data.

Step 102 is that meta-frame layer processing is performed on the data transmitted by each physical channel, and the data after the meta-frame layer processing is sent;

optionally, on the data sending side, line order adjustment is first performed on the data transmitted by each physical channel, and then meta-frame layer processing is performed on the data transmitted by each physical channel after the line order adjustment.

Optionally, as the link rate becomes higher and higher, the stability and reliability of the link are key factors of restricting the performance of a chip interface. When a failure or instability occurs on a link corresponding to a certain physical channel or some physical channels of the chip, the physical channel(s) is/are incapable of transmitting data normally; in a situation that the rest links can meet the data transmission bandwidth, the user can configure a line order adjustment relationship according to the bandwidth requirement and/or the stability state of the link; the data transmitted by the physical channel is transferred to a link of a redundant physical channel for transmission according to the line order adjustment relationship, thereby flexibly adjusting the mapping relationship of physical channels, and avoiding a link which works abnormally in data transmission.

Figure 4:
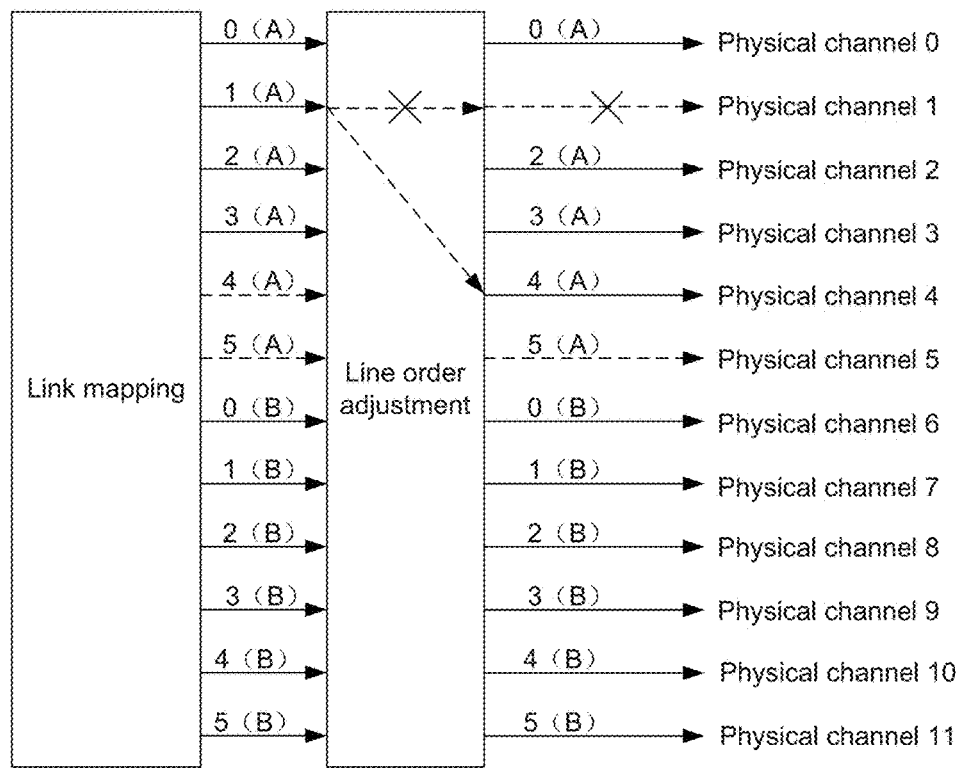
FIG. 4 is a diagram of line order adjustment on the data sending side of the present disclosure.

FIG. 4 is a diagram of line order adjustment on the data sending side of the present disclosure; as shown in FIG. 4, by taking that the protocol layer processing A in FIG. 3 needs four physical channels to transmit data for example, suppose that the four physical channels are respectively physical channels 0-3, the redundant physical channels of the protocol layer processing A are physical channels 4 and 5, and the link corresponding to the physical channel 1 is incapable of transmitting data normally, then, by the method of line order adjustment in the present disclosure, the line order adjustment can be performed to transfer the data transmitted by the physical channel 1 originally to the redundant physical channel 4 for transmission.

Optionally, encoding and framing are performed on the data transmitted by each physical channel, tags are respectively inserted in the data transmitted by each physical channel after the framing, and CRC calculation and scrambling are performed on the data transmitted by each physical channel after inserting the tags, so that the meta-frame layer processing performed on the data transmitted by each physical channel after the line order adjustment can be implemented; wherein, the encoding mode can be 64B or 67B encoding, the tags can represent an order of links for transmitting the data on each physical channel; optionally, the CRC calculation can be a CRC32 calculation, wherein the CRC32 calculation represents a 32-bit CRC calculation.

Figure 5:
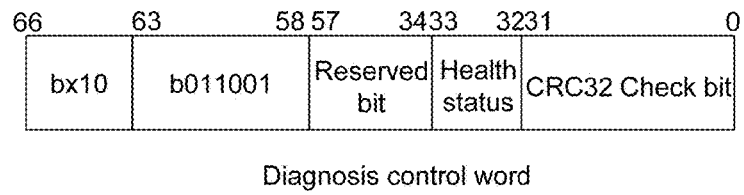
FIG. 5 is a structural diagram of a meta-frame layer diagnosis control word on the data sending side of the present disclosure.

Optionally, it is feasible to respectively insert the tags in the reserved fields of a meta-frame layer diagnosis control word of each physical channel after the framing; FIG. 5 is a structural diagram of a meta-frame layer diagnosis control word on the data sending side of the present disclosure; as shown in FIG. 5, the bits 0-31 of the diagnosis control word are check bits of the CRC32, the bits 32-33 are health status bits, the bits 34-57 are reserved bits, the bits 58-63 are b011001 bits, and the bits 63-66 are b×10 bits; wherein, the method of the present disclosure can respectively insert the tags in the reserved fields of the bits 34-57 of the diagnosis control word, wherein, the tags can be configured for the data sending side by the user, and the tags can be user-defined; the main configuration principle is that the tags can embody an order relationship of the data transmitted by the physical channels.

Figure 6:
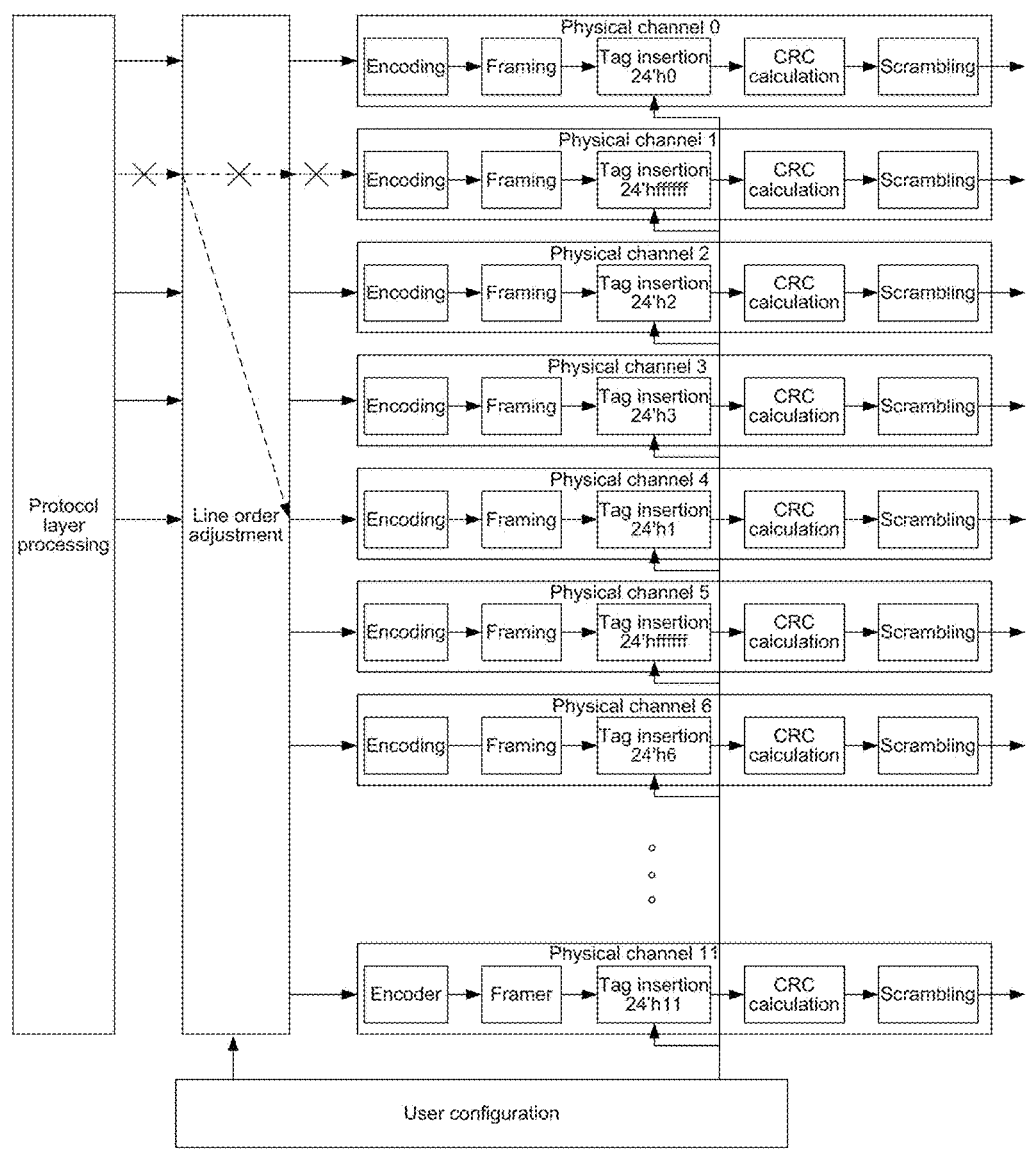
FIG. 6 is a diagram of tag insertion on the data sending side of the present disclosure.

FIG. 6 is a diagram of tag insertion on the data sending side of the present disclosure; as shown in FIG. 6, on the premise of the embodiment of line order adjustment in FIG. 4, the data transmitted by the physical channel 1 has been transferred to the redundant physical channel 4 for transmission, therefore, after the line order adjustment, for enabling the data receiving side to be informed of the sequence of the data transmitted by the physical channels, suppose that the tags configured by the user for the physical channels 0-5 on the data sending side are respectively: 24'h0, 24'h1, 24'h2, 24'h3, 24'hffffff and 24'hffffff; the line order adjustment is performed, therefore, the tags inserted for the physical channels 0-5 are respectively: 24'h0, 24'hffffff, 24'h2, 24'h3, 24'h1 and 24'hffffff, it can be seen that after performing the line order adjustment, the data transmitted by the physical channel 1 is transferred to the redundant physical channel 4 for transmission, so the tag of the redundant physical channel 4 is 24'h1, and the tag of the physical channel 1 is 24'hffffff.

Optionally, the tags configured for the physical channels 6-11 are respectively: 24'h6, 24'h7, 24'h8, 24'h9, 24'h10 and 24'h11; it should be noted that, since the tags can be user-defined, the tags are not limited to all contents listed in the above description.

Optionally, on the data sending side, the data after the meta-frame layer processing is sent to the data receiving side.

Figure 7:
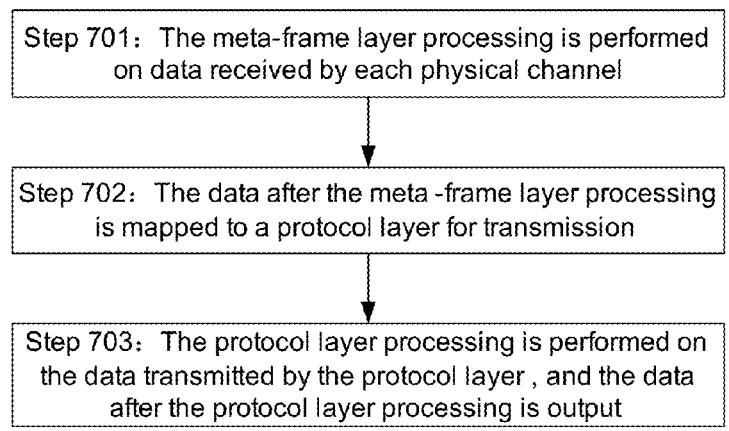
FIG. 7 is an implementation flowchart of a chip-based data transmission method according to embodiment 2 of the present disclosure.
Figure 8:
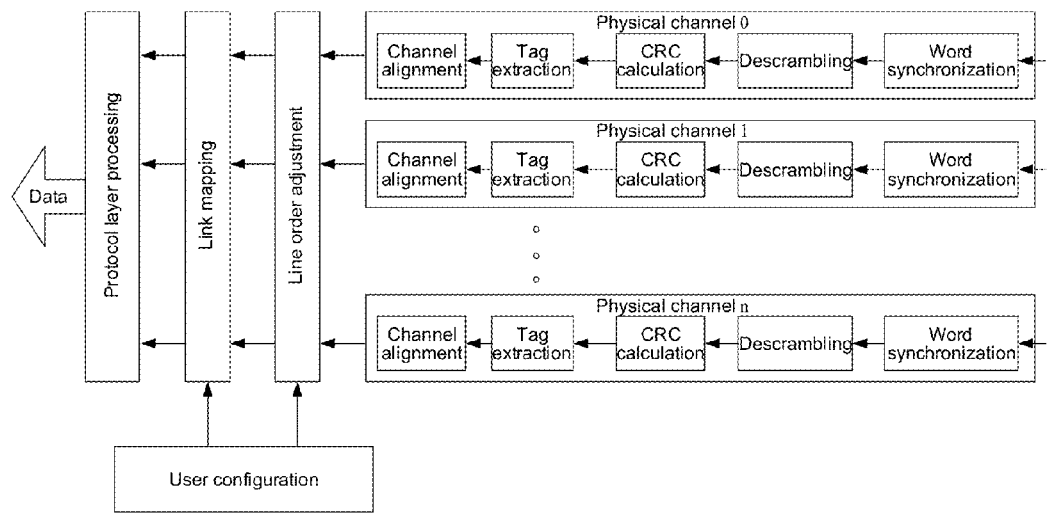
FIG. 8 is a data flow diagram of the chip-based data transmission method according to embodiment 2 of the present disclosure.

The present disclosure provides a chip-based data transmission method which is applied on the data receiving side, as shown in FIG. 7 and FIG. 8. FIG. 7 is an implementation flowchart of the chip-based data transmission method according to embodiment 2 of the present disclosure; FIG. 8 is a data flow diagram of the chip-based data transmission method according to embodiment 2 of the present disclosure; the method includes the following steps.

Step 701 is that meta-frame layer processing is performed on data received by each physical channel;

in this step, on the data receiving side, the data sent by the data sending side is received, then, after word synchronization is performed, the descrambling and the CRC calculation are performed on the data received by each physical channel, tags are extracted from the data transmitted by each physical channel after the CRC calculation, and channel alignment is performed according to the extracted tags and the data transmitted by each physical channel, so as to implement the meta-frame layer processing on the received data; optionally, the CRC calculation can be the CRC32 calculation, wherein the CRC32 calculation represents the 32-bit CRC calculation.

Step 702 is that the data after the meta-frame layer processing is mapped to the protocol layer for transmission;

optionally, on the data receiving side, line order recovery is performed on the data transmitted by each physical channel after the meta-frame layer processing, and then the data after the line order recovery is mapped to the protocol layer for transmission.

Optionally, the user first respectively configures tags for local channels on the data receiving side; then, the data receiving side respectively matches the tags extracted from the data transmitted by each physical channel to the tags of the local channels of it;

optionally, when they do not match, the line order recovery is automatically performed on the data transmitted by each physical channel according to the tags of the local channels on the data receiving side, and the data transmitted by each physical channel is respectively transferred to corresponding local channel for transmission;

when they match, the data transmitted by each physical channel is directly transferred to the corresponding local channel for transmission.

Figure 9:
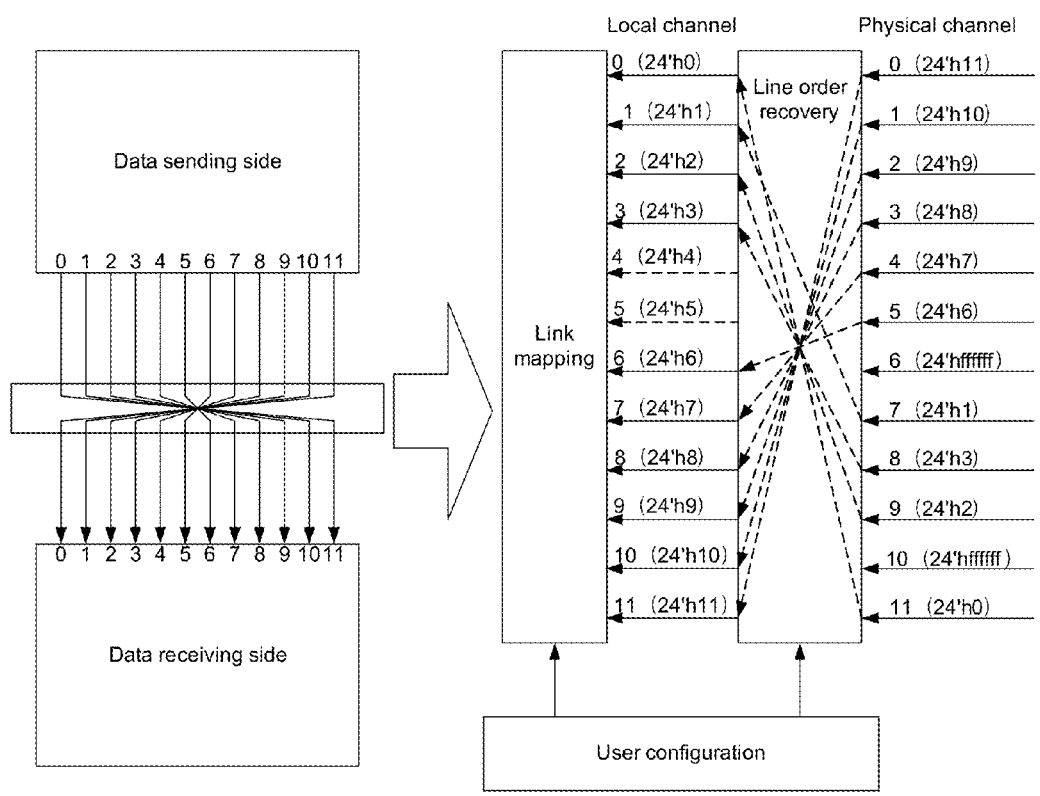
FIG. 9 is a diagram of line order recovery on a data receiving side of the present disclosure.

Optionally, FIG. 9 is a diagram of line order recovery on the data receiving side of the present disclosure; as shown in FIG. 9, on the premise of the line order adjustment in FIG. 4 and the tag insertion in FIG. 6, the order of circuit connection at connectors of the PCB is reverse, therefore, when the data is sent from the data sending side to the data receiving side, the order of links becomes reverse; on the data receiving side in FIG. 9, a tag is extracted from each physical channel, and the extracted tag is matched to the tag of each local channel on the data receiving side which is configured by the user; if they match, then the data transmitted by each physical channel is directly transferred to a corresponding local channel; if they do not match, the line order recovery is automatically performed on the data transmitted by each physical channel according to the tags of the local channels on the data receiving side which are configured by the user, and the data transmitted by each physical channel is respectively transferred to the corresponding local channel; in this way, the order of links of the data receiving side is not influenced by PCB placement; in addition, if the line order is adjusted for avoiding the unstable physical channel on the data sending side, then the line order of the data transmitted by each physical channel can also be recovered on the data receiving side according to the above method.

In practical application, because of the problem caused by PCB wiring and incompatibility, line disorder between ports of the data sending side and the data receiving side often happen; at present, the problem can only be solved by changing the PCB placement, which wastes manpower and material resources. The method of automatically performing line order adjustment presented in the present disclosure can completely solve the above problem.

Figure 10:
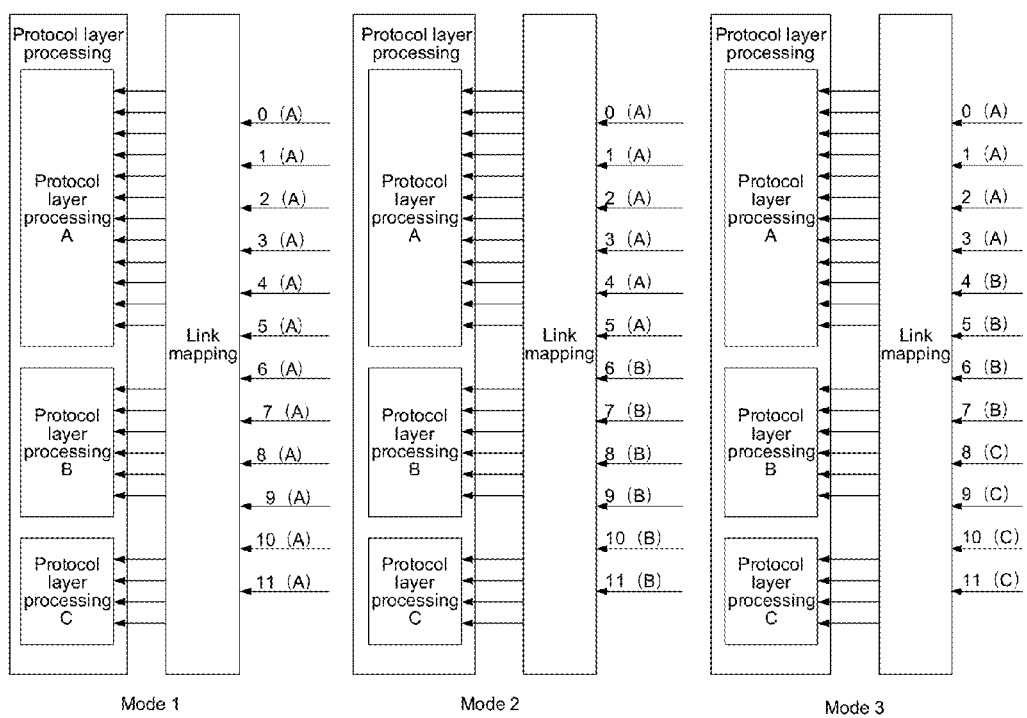
FIG. 10 is a diagram of link mapping on the data receiving side of the present disclosure.

Optionally, the user can configure a mapping relationship according to the type of a chip interface and/or a bandwidth requirement of the data receiving side, and maps the data transmitted by each physical channel after the meta-frame layer processing to the protocol layer for transmission according to the mapping relationship; similar to the diagram of a link mapping relationship on the data sending side as shown in FIG. 3, FIG. 10 is a diagram of link mapping on the data receiving side of the present disclosure; as shown in FIG. 10, in three different link mapping modes, the protocol layer processing on the data receiving side includes coordinate and independent processing procedures of three protocol layers A, B and C, wherein, the data after link mapping enters the three protocol layers A, B and C, respectively; in the processing procedures of the three protocol layers A, B and C, the protocol layer processing performed on the data is identical; it should be noted that, A, B and C here are only for differentiating each other, and do not form a limit to the present disclosure; as shown in FIG. 10, the data passing through 12 physical channels respectively enters the protocol layers A, B and C after link mapping; it should be noted that, 12 here is only taken for example, and does not form a limit to the present disclosure.

Optionally, in mode 1, according to the mapping relationship configured by the user, all the 12 physical channels are for transmitting the data after the protocol layer processing A;

in mode 2, according to the mapping relationship configured by the user, the physical channels 0-5 are for transmitting the data after the protocol layer processing A, and the physical channels 6-11 are for transmitting the data after the protocol layer processing B;

in mode 3, according to the mapping relationship configured by the user, the physical channels 0-3 are for transmitting the data after the protocol layer processing A, the physical channels 4-7 are for transmitting the data after the protocol layer processing B, and the physical channels 8-11 are for transmitting the data after the protocol layer processing C; it can be seen that only 12 physical channels can meet the requirements of different types of interfaces for transmitting data.

Step 703 is that the protocol layer processing is performed on the data transmitted by the protocol layer, and the data after the protocol layer processing is output.

in this step, striping processing is performed on the data transmitted by each physical channel and the CRC calculation is performed on the data after the striping processing, de-encapsulation is performed on the data after the CRC calculation, so as to implement the protocol layer processing on the data transmitted by the protocol layer; then, the data after the protocol layer processing is output; optionally, the CRC calculation can be the CRC24 calculation, wherein the CRC24 calculation represents the 24-bit CRC calculation.

Figure 11:
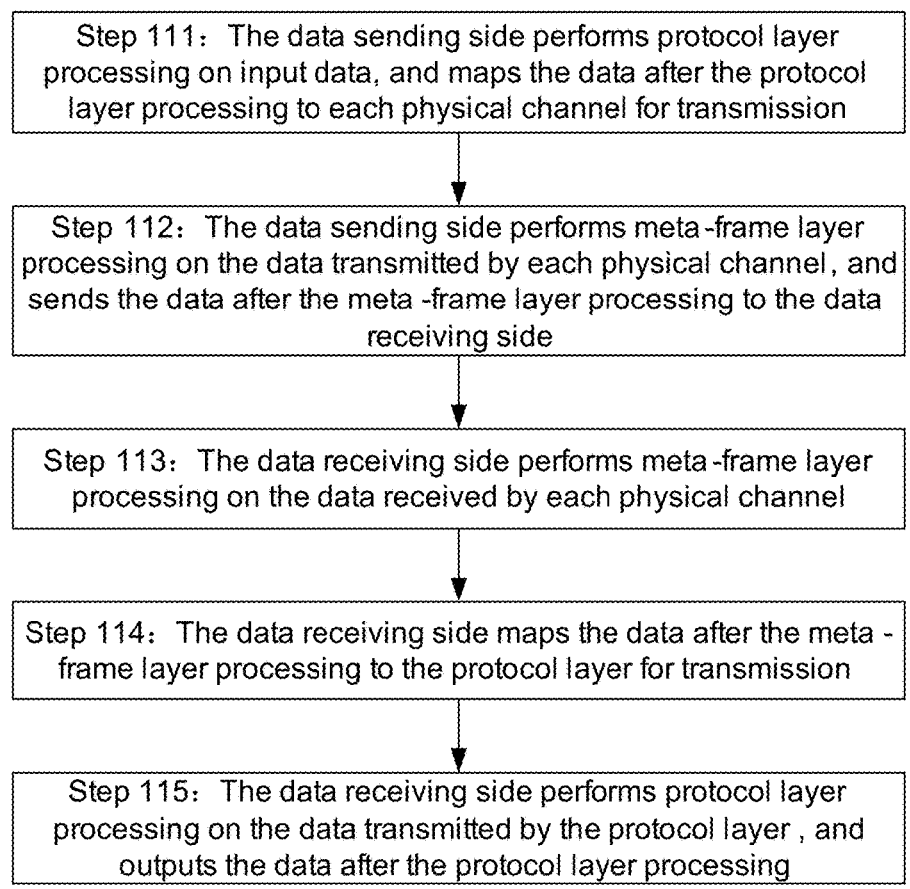
FIG. 11 is an implementation flowchart of a chip-based data transmission method according to embodiment 3 of the present disclosure.

The present disclosure provides a chip-based data transmission method, as shown in FIG. 11 and FIG. 12; FIG. 11 is an implementation flowchart of the chip-based data transmission method according to embodiment 3 of the present disclosure; FIG. 12 is a data flow diagram of the chip-based data transmission method according to embodiment 3 of the present disclosure; the method includes the following steps.

Step 111 is that on the data sending side, the protocol layer processing is performed on the input data, and the data after the protocol layer processing is mapped to each physical channel for transmission;

in this step, on the data sending side, the input data is encapsulated, the CRC calculation is performed on the data after the encapsulation, and the striping processing is performed on the data after the CRC calculation, so as to implement the protocol layer processing on the input data; optionally, the CRC calculation can be the CRC24 calculation, wherein the CRC24 calculation represents the 24-bit CRC calculation.

Optionally, after the protocol layer processing performed on the input data is completed, the user can configure a mapping relationship according to the type of a chip interface and/or a bandwidth requirement of the data sending side; on the data sending side the data after the protocol layer processing is mapped to each physical channel for transmission according to the mapping relationship; wherein, multiplexing of each physical channel can be realized by mapping the data after the protocol layer processing to different physical channels for transmission; thus, the resource, area and power of a chip can be reduced by multiplexing each physical channel.

Step 112 is that on the data sending side the meta-frame layer processing is performed on the data transmitted by each physical channel, and the data after the meta-frame layer processing is sent to the data receiving side;

in this step, on the data sending side the line order adjustment is performed on the data transmitted by each physical channel, and then the meta-frame layer processing is performed on the data transmitted by each physical channel after the line order adjustment.

Optionally, when a failure or instability occurs on a link corresponding to a certain physical channel or some physical channels of the chip, the physical channel(s) is/are incapable of transmitting data normally; in a situation that the rest links can meet the data transmission bandwidth, the user can configure a line order adjustment relationship according to the bandwidth requirement and/or the stability state of the link; the data transmitted by the physical channel is transferred to a link of a redundant physical channel for transmission according to the line order adjustment relationship, thereby flexibly adjusting the mapping relationship of physical channels, and avoiding the link that works abnormally in the data transmission.

Optionally, encoding and framing are performed on the data transmitted by each physical channel after the line order adjustment, the tags are respectively inserted in the data transmitted by each physical channel after the framing, and the CRC calculation and scrambling are performed on the data transmitted by each physical channel after inserting the tags, so that the meta-frame layer processing can be performed on the data transmitted by each physical channel after the line order adjustment; wherein, the encoding mode can be 64B or 67B encoding, the tags can represent the order of links for transmitting the data in each physical channel; optionally, the CRC calculation can be the CRC32 calculation, wherein the CRC32 calculation represents the 32-bit CRC calculation.

Step 113 is that on the data receiving side the meta-frame layer processing is performed on the data received by each physical channel;

in this step, on the data receiving side, the data sent by the data sending side is received, then, after the word synchronization, the descrambling and the CRC calculation are performed on the data received by each physical channel, the tags are extracted from the data transmitted by each physical channel after the CRC calculation, and the channel alignment is performed according to the extracted tags and the data transmitted by each physical channel, so as to implement the meta-frame layer processing on the received data; optionally, the CRC calculation can be the CRC32 calculation, wherein the CRC32 calculation represents the 32-bit CRC calculation.

Step 114 is that on the data receiving side, the data after the meta-frame layer processing is mapped to the protocol layer for transmission;

in this step, on the data receiving side, the line order recovery is performed on the data transmitted by each physical channel after the meta-frame layer processing, and then the data after the line order recovery is mapped to the protocol layer for transmission.

Optionally, the user first respectively configures the tags for the local channels on the data receiving side; then, on the data receiving side, the tags extracted from the data transmitted by each physical channel are matched respectively to the tags of the local channels of the data receiving side;

optionally, when they do not match, the line order recovery is automatically performed on the data transmitted by each physical channel according to the tags of the local channels of the data receiving side, and the data transmitted by each physical channel is respectively transferred to the corresponding local channel for transmission;

when they match, the data transmitted by each physical channel is directly transferred to the corresponding local channel for transmission.

Optionally, the user can configure a mapping relationship according to the type of a chip interface and/or a bandwidth requirement of the data receiving side, and maps the data transmitted by each physical channel after the meta-frame layer processing to the protocol layer for transmission according to the mapping relationship.

Step 115 is that on the data receiving side, the protocol layer processing is performed on the data transmitted by the protocol layer, and the data after the protocol layer processing is output;

in this step, the striping processing is performed on the data transmitted by each physical channel and the CRC calculation is performed on the data after the striping processing, de-encapsulation is performed on the data after the CRC calculation, so as to implement the protocol layer processing on the data transmitted by the protocol layer; then, the data after the protocol layer processing is output; optionally, the CRC calculation can be the CRC24 calculation, wherein the CRC24 calculation represents the 24-bit CRC calculation.

The present disclosure also provides a chip-based data transmission device which is arranged on the data sending side, as shown in FIG. 13. FIG. 13 is a structural diagram of the chip-based data transmission device according to embodiment 1 of the present disclosure; the device includes a first protocol layer processing unit 131, a first link mapping unit 132, a first meta-frame layer processing unit 134 and a sending unit 135; wherein, the first protocol layer processing unit 131 is configured to perform protocol layer processing on input data;

the first link mapping unit 132 is configured to map the data after the protocol layer processing to each physical channel for transmission;

the first meta-frame layer processing unit 134 is configured to perform meta-frame layer processing on the data transmitted by each physical channel;

the sending unit 135 is configured to send the data after the meta-frame layer processing.

Optionally, as shown in FIG. 13, the device further includes a line order adjustment unit 133; wherein, the line order adjustment unit 133 is configured to perform line order adjustment on the data transmitted by each physical channel;

the first meta-frame layer processing unit 134 is specifically configured to perform the meta-frame layer processing on the data transmitted by each physical channel after the line order adjustment.

Optionally, as shown in FIG. 13, the device further includes a first configuring unit 136; wherein, the first configuring unit 136 is configured to configure a mapping relationship according to the type of a chip interface and/or a bandwidth requirement;

the first link mapping unit 132 is specifically configured to map the data after the protocol layer processing to each physical channel for transmission according to the mapping relationship.

Optionally, the first configuring unit 136 is further configured to, when a link corresponding to a physical channel is incapable of transmitting data normally, configure a line order adjustment relationship according to a bandwidth requirement and/or a stability state of the link;

the line order adjustment unit 133 is specifically configured to transfer the data transmitted by the physical channel to a link of a redundant physical channel for transmission according to the line order adjustment relationship.

Optionally, FIG. 14 is a structural diagram of the first protocol layer processing unit of the present disclosure; as shown in FIG. 14, the first protocol layer processing unit 131 includes a first encapsulation subunit 141, a first CRC subunit 142 and a first striping subunit 143; wherein, the first encapsulation subunit 141 is configured to encapsulate the data;

the first CRC subunit 142 is configured to perform the CRC calculation on the data after the encapsulation; and the first striping subunit 143 is configured to perform the striping processing on the data after the CRC calculation.

Figure 15:
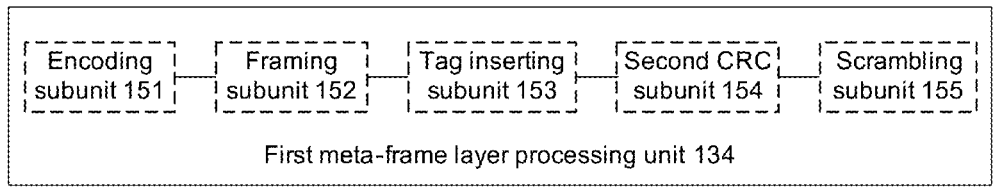
FIG. 15 is a structural diagram of a first meta-frame layer processing unit of the present disclosure.

Optionally, FIG. 15 is a structural diagram of the first meta-frame layer processing unit of the present disclosure; as shown in FIG. 15, the first meta-frame layer processing unit 134 includes an encoding subunit 151, a framing subunit 152, a tag inserting subunit 153, a second CRC subunit 154 and a scrambling subunit 155; wherein, the encoding subunit 151 is configured to encode the data transmitted by each physical channel;

the framing subunit 152 is configured to perform framing on the data transmitted by each physical channel after the encoding;

the tag inserting subunit 153 is configured to respectively insert tags in the data transmitted by each physical channel after the framing;

optionally, the tag inserting subunit 153 is specifically configured to respectively insert the tags in the reserved fields of a meta-frame layer diagnosis control word of each physical channel after the framing;

the second CRC subunit 154 is configured to perform the CRC calculation on the data transmitted by each physical channel after inserting the tags;

the scrambling subunit 155 is configured to perform scrambling on the data transmitted by each physical channel after the CRC calculation.

The sending unit 135 is configured to send the data after the meta-frame layer processing.

Optionally, the sending unit 135 is specifically configured to send the data after the meta-frame layer processing to the data receiving side.

Figure 16:
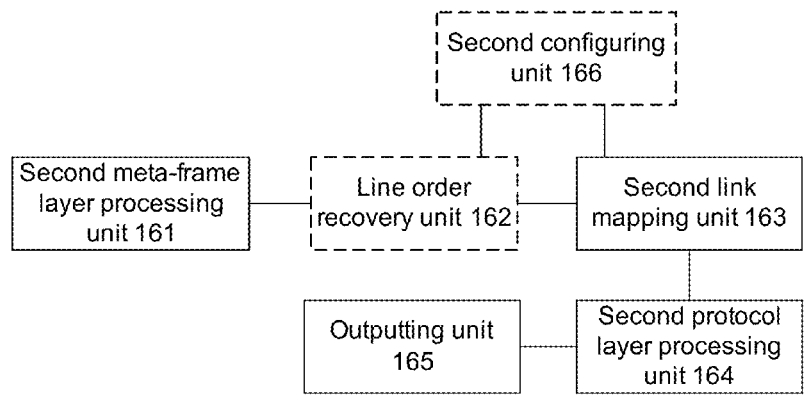
FIG. 16 is a structural diagram of the chip-based data transmission device according to embodiment 2 of the present disclosure.

The present disclosure provides a chip-based data transmission device which is arranged on the data receiving side. FIG. 16 is a structural diagram of the chip-based data transmission device according to embodiment 2 of the present disclosure; as shown in FIG. 16, the device includes a second meta-frame layer processing unit 161, a second link mapping unit 163, a second protocol layer processing unit 164 and a outputting unit 165; wherein, the second meta-frame layer processing unit 161 is configured to perform meta-frame layer processing on the data received by each physical channel;

the second link mapping unit 163 is configured to map the data after the meta-frame layer processing to a protocol layer for transmission;

the second protocol layer processing unit 164 is configured to perform protocol layer processing on the data transmitted by the protocol layer; and the outputting unit 165 is configured to output the data after the protocol layer processing.

Optionally, as shown in FIG. 16, the device further includes a line order recovery unit 162; wherein, the line order recovery unit 162 is configured to perform line order recovery on the data transmitted by each physical channel after the meta-frame layer processing;

the second link mapping unit 163 is specifically configured to map the data after the line order recovery to a protocol layer for transmission.

Figure 17:
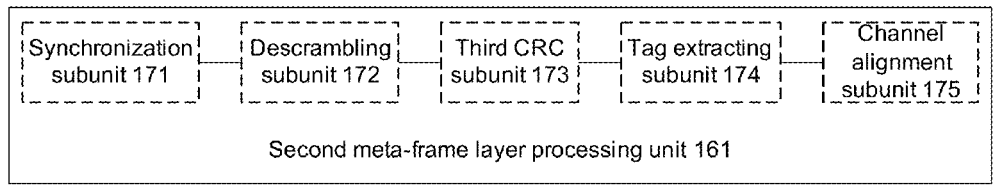
FIG. 17 is a structural diagram of a second meta-frame layer processing unit of the present disclosure.

Optionally, FIG. 17 is a structural diagram of the second meta-frame layer processing unit of the present disclosure; as shown in FIG. 17, the second meta-frame layer processing unit 161 includes a synchronization subunit 171, a descrambling subunit 172, a third CRC subunit 173, a tag extracting subunit 174 and a channel alignment subunit 175; wherein, the synchronization subunit 171 is configured to perform word synchronization on the data received by each physical channel;

the descrambling subunit 172 is configured to perform descrambling on the data transmitted by each physical channel after the word synchronization;

the third CRC subunit 173 is configured to perform a CRC calculation on the data transmitted by each physical channel after the descrambling;

the tag extracting subunit 174 is configured to extract tags from the data transmitted by each physical channel after the CRC calculation;

the channel alignment subunit 175 is configured to perform channel alignment according to the extracted tags and the data transmitted by each physical channel.

Optionally, as shown in FIG. 16, the device further includes a second configuring unit 166; wherein, the second configuring unit 166 is configured to respectively configure tags for local channels of the data receiving side;

the line order recovery unit 162 is specifically configured to respectively match the extracted tags to the tags of the local channels of the data receiving side; when they do not match, perform the line order recovery on the data transmitted by each physical channel according to the tags of the local channels of the data receiving side, and respectively transfer the data transmitted by each physical channel to the corresponding local channels for transmission; when they match, respectively transfer the data transmitted by each physical channel to the corresponding local channels for transmission.

Optionally, the second configuring unit 166 is further configured to configure a mapping relationship according to the type of a chip interface and/or a bandwidth requirement;

the second link mapping unit 163 is specifically configured to map the data after the meta-frame layer processing to a protocol layer for transmission according to the mapping relationship.

Figure 18:
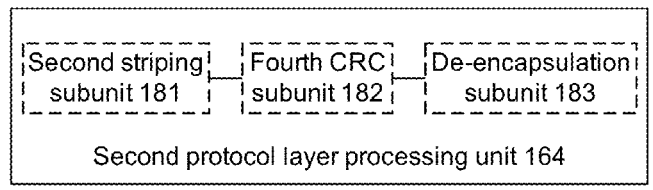
FIG. 18 is a structural diagram of a second protocol layer processing unit of the present disclosure.

Optionally, FIG. 18 is a structural diagram of the second protocol layer processing unit of the present disclosure; as shown in FIG. 18, the second protocol layer processing unit 164 includes a second striping subunit 181, a fourth CRC subunit 182 and a de-encapsulation subunit 183; wherein, the second striping subunit 181 is configured to perform the striping processing on the data transmitted by each local channel;

the fourth CRC subunit 182 is configured to perform the CRC calculation on the data after the striping processing;

de-encapsulation subunit 183 is configured to perform de-encapsulation on the data after the CRC calculation.

Figure 19:
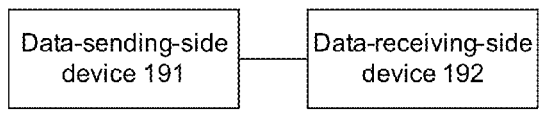
FIG. 19 is a structural diagram of a chip-based data transmission system of the present disclosure.

The present disclosure also provides a chip-based data transmission system; FIG. 19 is a structural diagram of the chip-based data transmission system of the present disclosure; as shown in FIG. 19, the system includes a data-sending-side device 191 and a data-receiving-side device 192; wherein, the data-sending-side device 191 is configured to perform protocol layer processing on input data, map the data after the protocol layer processing to each physical channel for transmission, perform meta-frame layer processing on the data transmitted by each physical channel, and send the data after the meta-frame layer processing; and the data-receiving-side device 192 is configured to perform meta-frame layer processing on the data received by each physical channel, map the data after the meta-frame layer processing to a protocol layer for transmission, perform the protocol layer processing on the data transmitted by the protocol layer, and output the data after the protocol layer processing.

Optionally, the data-sending-side device 191 is the device in FIG. 13, including the first protocol layer processing unit 131, the first link mapping unit 132, the line order adjustment unit 133, the first meta-frame layer processing unit 134, the sending unit 135 and the first configuring unit 136;

the data-receiving-side device 192 is the device in FIG. 16, including the second meta-frame layer processing unit 161, the line order recovery unit 162, the second link mapping unit 163, the second protocol layer processing unit 164, the outputting unit 165 and the second configuring unit 166;

it should be noted that, the first configuring unit 136 on the data sending side and the second configuring unit 166 on the data receiving side can be implemented by one configuring unit, that is, the data sending side and the data receiving side can share the same configuring unit.

In practical application, the first protocol layer processing unit 131, the first link mapping unit 132, the line order adjustment unit 133, the first meta-frame layer processing unit 134, the sending unit 135, the first configuring unit 136, the first encapsulation subunit 141, the first CRC subunit 142, the first striping subunit 143, the tag inserting subunit 153, the second CRC subunit 154 and the scrambling subunit 155 can be implemented by a Central Processing Unit (CPU), a Digital Signal Processor (DSP) or a Field Programmable Gate Array (FPGA) of the data sending side; the encoding subunit 151 and the framing subunit 152 can be implemented by an encoder and a framer of the data sending side.

The second meta-frame layer processing unit 161, the line order recovery unit 162, the second link mapping unit 163, the second protocol layer processing unit 164, the outputting unit 165, the second configuring unit 166, the synchronization subunit 171, the descrambling subunit 172, the third CRC subunit 173, the tag extracting subunit 174, the channel alignment subunit 175, the second striping subunit 181, the fourth CRC subunit 182 and de-encapsulation subunit 183 can be implemented by a CPU, a DSP or an FPGA of the data receiving side.

When the chip-based data transmission methods in the present disclosure are implemented in the form of software function modules and sold or used as an independent product, it can also be stored in a computer-readable storage medium. Based on this understanding, those skilled in the art should appreciate that the embodiments in this application can be provided as a method, a system or a computer program product. So, this application can adopt a full hardware embodiment, a full software embodiment, or an embodiment combining software with hardware. Besides, this application can adopt the form of a computer program product which is implemented on one or more computer available storage media in which computer available program codes are included; the storage media include, but are not limited to, a USB flash disk, a mobile hard disk, a Read-Only Memory (ROM), a disk storage, a CD-ROM, an optical memory, and so on.

This application is described according to the flowcharts and/or block diagrams of the method, the device, the system and the computer program product in the embodiments of the application. It should be understood that each flow and/or block in the flowchart and/or block diagram, and the combination of the flow and/or block in the flowchart and/or block diagram can be implemented by computer program instructions. These computer program instructions can be provided to a processing unit of a general-purpose computer, a special-purpose computer, an embedded processor or other programmable data processing equipment to generate a machine, so that instructions which are executed by the processing unit of the computer or other programmable data processing equipment generate a device which is for implementing specified functions in one or more flows of the flowchart and/or one or more blocks of the block diagram.

These computer program instructions can also be stored in a computer-readable memory which can guide the computer or other programmable data processing devices to work in a particular way, so that the instructions stored in the computer-readable memory generate a product including an instruction device, wherein the instruction device implements the specified functions in one or more flows of the flowchart and/or one or more blocks of the block diagram.

These computer program instructions can also be loaded on the computer or other programmable data processing devices, so that a series of operation steps are executed on the computer or other programmable data processing devices to generate the processing steps implemented by the computer, and the instructions executed on the computer or other programmable data processing devices provide the steps for implementing the specified functions in one or more flows of the flowchart and/or one or more blocks of the block diagram.

Correspondingly, the present disclosure also provides a computer storage medium which stores a computer program, wherein the computer program is for executing the chip-based data transmission methods described in the embodiments of the method according to the present disclosure.

The above units can be implemented by a CPU, a DSP or a FPGA in electronic equipment.

Those skilled in the art should appreciate that the embodiments in the present disclosure can be provided as a method, a system or a computer program product. So, the present disclosure can adopt a full hardware embodiment, a full software embodiment, or an embodiment combining software with hardware. Besides, the present disclosure can adopt the form of a computer program product which is implemented on one or more computer available storage media (which include, but are not limited to, the disk memory, the optical memory, and so on) in which computer available program codes are included.

The present disclosure is described with reference to the flowcharts and/or block diagrams of the method, the device (system) and the computer program product according to the embodiments of the present disclosure. It should be understood that each flow and/or block in the flowchart and/or block diagram, and the combination of the flow and/or block in the flowchart and/or block diagram can be implemented by the computer program instructions. These computer program instructions can be provided to the processing unit of the general-purpose computer, the special-purpose computer, the embedded processor or other programmable data processing equipment to generate a machine, so that instructions which are executed by the processing unit of the computer or other programmable data processing equipment generate the device which is for implementing the specified functions in one or more flows of the flowchart and/or one or more blocks of the block diagram.

These computer program instructions can also be stored in the computer-readable memory which can guide the computer or other programmable data processing devices to work in a particular way, so that the instructions stored in the computer-readable memory generate a product including an instruction device, wherein the instruction device implements the specified functions in one or more flows of the flowchart and/or one or more blocks of the block diagram.

These computer program instructions can also be loaded on a computer or other programmable data processing devices, so that a series of operation steps are executed on the computer or other programmable data processing devices to generate the processing steps implemented by the computer, and the instructions executed on the computer or other programmable data processing devices provide the steps for implementing the specified functions in one or more flows of the flowchart and/or one or more blocks of the block diagram.

What is claimed is:

1. A chip-based data transmission method, applied on a data sending side, the method comprising:

performing protocol layer processing on data which is input, and mapping the data after the protocol layer processing to each physical channel for transmission;

performing a line order adjustment on the data transmitted by the each physical channel;

performing meta-frame layer processing on the data transmitted by the each physical channel after the line order adjustment;

wherein performing the meta-frame layer processing on the data transmitted by the each physical channel comprises:

performing encoding and framing on the data transmitted by the each physical channel;

respectively inserting tags in the data transmitted by the each physical channel after the framing; and performing a Cyclic Redundancy Check Code (CRC) calculation and scrambling on the data transmitted by the each physical channel after the tags are inserted;

wherein the tags represent an order of links for transmitting the data on the each physical channel, such that a data receiving side determines whether to perform a line order recovery on the data transmitted by the each physical channel by matching tags extracted from the data transmitted by the each physical channel to tags of local channels on the data receiving side; and sending the data after the meta-frame layer processing.

2. The method according to claim 1, further comprising:

configuring a mapping relationship according to a type of a chip interface and/or a bandwidth requirement;

mapping the data after the protocol layer processing to the each physical channel for transmission comprises: mapping the data after the protocol layer processing to the each physical channel for transmission according to the mapping relationship.

3. The method according to claim 1, wherein performing the line order adjustment on the data transmitted by the each physical channel comprises:

configuring a line order adjustment relationship according to a bandwidth requirement and/or a stability state of the link when a link corresponding to a physical channel is incapable of transmitting data normally; and transferring the data transmitted by the physical channel to a link of a redundant physical channel for transmission according to the line order adjustment relationship.

4. The method according to claim 1, wherein respectively inserting the tags in the data transmitted by the each physical channel after the framing comprises: respectively inserting the tags in reserved fields of a meta-frame layer diagnosis control word of the each physical channel after the framing.

5. A chip-based data transmission method, applied on a data receiving side, comprising:

performing meta-frame layer processing on data received by each physical channel;

mapping the data after the meta-frame layer processing to a protocol layer for transmission; and performing protocol layer processing on the data transmitted by the protocol layer, and outputting the data after the protocol layer processing, wherein mapping the data after the meta-frame layer processing to the protocol layer for transmission comprises:

performing line order recovery on the data transmitted by the each physical channel after the meta-frame layer processing; and mapping the data after the line order recovery to the protocol layer for transmission;

wherein the method further comprises:

respectively configuring tags for local channels on the data receiving side;

performing the line order recovery on the data transmitted by the each physical channel comprises: respectively matching tags extracted from the data transmitted by the each physical channel to the tags of the local channels on the data receiving side;

when they do not match, performing the line order recovery on the data transmitted by the each physical channel according to the tags of the local channels on the data receiving side, and respectively transferring the data transmitted by the each physical channel to corresponding local channels for transmission;

when they match, respectively transferring the data transmitted by the each physical channel to the corresponding local channels for transmission.

6. The method according to claim 5, wherein performing the meta-frame layer processing on the data received by the each physical channel comprises:

performing word synchronization, descrambling and a Cyclic Redundancy Check Code (CRC) calculation on the data received by the each physical channel;

extracting tags from the data transmitted by the each physical channel after the CRC calculation; and performing channel alignment according to the extracted tags and the data transmitted by the each physical channel.

7. The method according to claim 5, further comprising:

configuring a mapping relationship according to a type of a chip interface and/or a bandwidth requirement;

mapping the data after the meta-frame layer processing to the protocol layer for transmission comprises: mapping the data after the meta-frame layer processing to the protocol layer for transmission according to the mapping relationship.

8. A chip-based data transmission device which is arranged on a data sending side, comprising a processor and a memory storing computer-readable operation instructions, wherein when the computer-readable operation instructions in the memory are run, the processor is configured to:

perform protocol layer processing on data which is input;

map the data after the protocol layer processing to each physical channel for transmission;

perform a line order adjustment on the data transmitted by the each physical channel;

perform meta-frame layer processing on the data transmitted by the each physical channel after the line order adjustment;

wherein performing the meta-frame layer processing on the data transmitted by the each physical channel comprises:

performing encoding and framing on the data transmitted by the each physical channel;

respectively inserting tags in the data transmitted by the each physical channel after the framing; and performing a Cyclic Redundancy Check Code (CRC) calculation and scrambling on the data transmitted by the each physical channel after the tags are inserted;

wherein the tags represent an order of links for transmitting the data on the each physical channel, such that a data receiving side determines whether to perform a line order recovery on the data transmitted by the each physical channel by matching tags extracted from the data transmitted by the each physical channel to tags of local channels on the data receiving side;

and send the data after the meta-frame layer processing.

9. The device according to claim 8, wherein the processor is further configured to:

configure a mapping relationship according to a type of a chip interface and/or a bandwidth requirement; and map the data after the protocol layer processing to the each physical channel for transmission according to the mapping relationship.

10. The device according to claim 8, wherein the processor is further configured to:

when a link corresponding to a physical channel is incapable of transmitting data normally, configure a line order adjustment relationship according to a bandwidth requirement and/or a stability state of the link; and transfer the data transmitted by the physical channel to a link of a redundant physical channel for transmission according to the line order adjustment relationship.

11. The device according to claim 8, wherein the processor is further configured to:

respectively insert the tags in reserved fields of a meta-frame layer diagnosis control word of the each physical channel after the framing.

12. A chip-based data transmission device which is arranged on a data receiving side, comprising a processor and a memory storing computer-readable operation instructions, wherein when the computer-readable operation instructions in the memory are run, the processor is configured to:

perform meta-frame layer processing on data received by each physical channel;

map the data after the meta-frame layer processing to a protocol layer for transmission;

perform protocol layer processing on the data transmitted by the protocol layer;

output the data after the protocol layer processing, wherein the processor is further configured to: perform line order recovery on the data transmitted by the each physical channel after the meta-frame layer processing; and map the data after the line order recovery to the protocol layer for transmission;

wherein the processor is further configured to:

respectively configure tags for local channels on the data receiving side;

respectively match tags extracted from the data transmitted by the each physical channel to the tags of the local channels on the data receiving side; when they do not match, perform the line order recovery on the data transmitted by the each physical channel according to the tags of the local channels on the data receiving side, and respectively transfer the data transmitted by the each physical channel to corresponding local channels for transmission; when they match, respectively transfer the data transmitted by the each physical channel to the corresponding local channels for transmission.

13. The device according to claim 12, wherein the processor is further configured to:

perform word synchronization on the data received by the each physical channel;

perform descrambling on the data transmitted by the each physical channel after the word synchronization;

perform a CRC calculation on the data transmitted by the each physical channel after the descrambling;

extract tags from the data transmitted by the each physical channel after the CRC calculation; and perform channel alignment according to the extracted tags and the data transmitted by the each physical channel.

14. The device according to claim 12, wherein the processor is further configured to:

configure a mapping relationship according to a type of a chip interface and/or a bandwidth requirement;

map the data after the meta-frame layer processing to the protocol layer for transmission according to the mapping relationship;

wherein the processor is further configured to:

perform striping processing on the data transmitted by the local channels;

perform a CRC calculation on the data after the striping processing; and perform de-encapsulation on the data after the CRC calculation.

* * * * *